United States Patent [19]

Benjamin

[11] 4,154,146

[45] May 15, 1979

[54] TWO STAGE VACUUM BREAK

[75] Inventor: Benjamin C. Benjamin, Flint, Mich.

[73] Assignee: Schmelzer Corporation, Durand, Mich.

[21] Appl. No.: 835,140

[22] Filed: Sep. 21, 1977

[51] Int. Cl.[2] .......................... F01B 19/00; F16J 3/02; F15B 15/22

[52] U.S. Cl. .......................................... 91/25; 91/47; 91/395; 91/409; 92/94

[58] Field of Search ................. 91/409, 408, 357, 395, 91/49, 47, 173, 25; 92/94

[56] References Cited

U.S. PATENT DOCUMENTS

| | | | |
|---|---|---|---|
| 2,782,025 | 2/1957 | Olson | 91/394 |
| 3,072,108 | 1/1963 | Cripe | 91/357 |
| 3,381,582 | 5/1968 | Golden | 91/409 |

*Primary Examiner*—Paul E. Maslousky

*Attorney, Agent, or Firm*—Fisher, Gerhardt & Groh

[57] ABSTRACT

A fluid motor or vacuum break for use with the carburetor of an internal combustion engine in which an output plunger of the motor moves in two stages and at different rates in each of the stages through means of an auxiliary housing supported within the main housing. Upon admission of vacuum pressure to the primary housing and output plunger moves in a first stage at the end of which vacuum pressure is admitted to the auxiliary housing causing it to collapse and move the plunger in a second stage.

8 Claims, 4 Drawing Figures

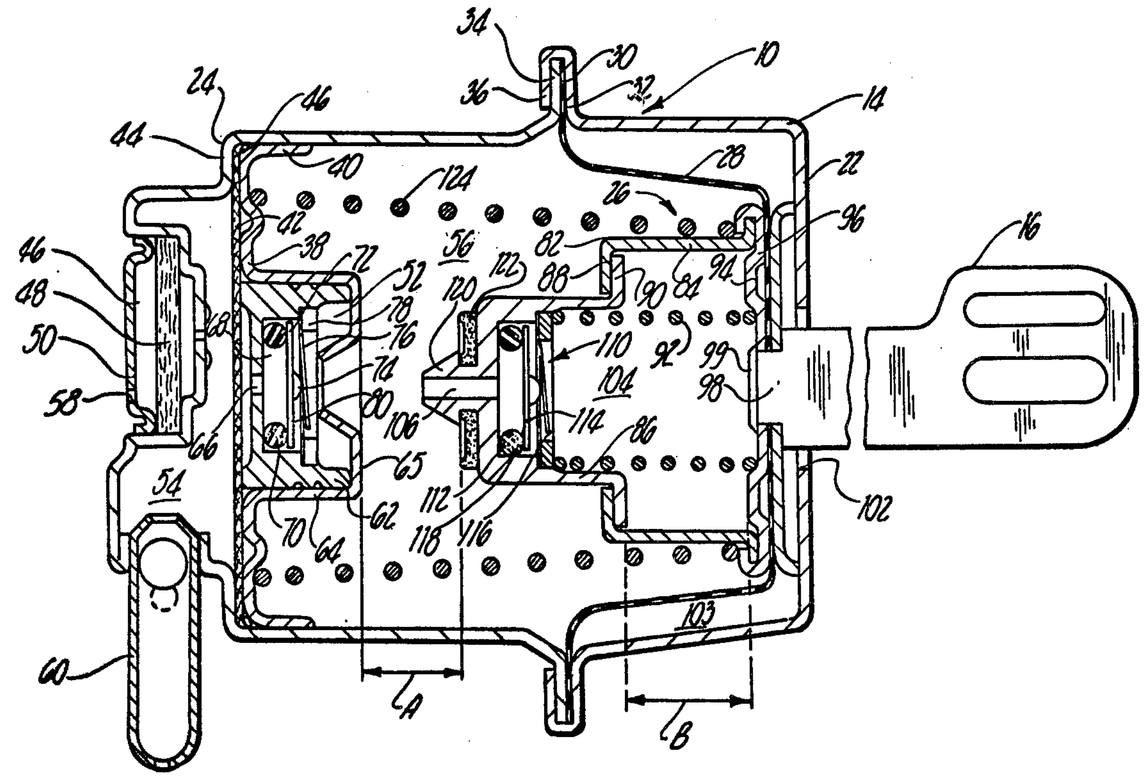

TWO STAGE VACUUM BREAK

The present invention relates to charge forming devices for internal combustion engines and more particularly to control means for opening the choke valve after the engine is started. In charge forming systems of internal combustion engines vacuum breaks in the form of vacuum actuated servo motors are used to open the choke valve after the engine has started. In some instances at lease two vacuum break devices are required, both of which must be designed for the particular model of engine and for the automobile in which the device is used. This makes it necessary not only to have two vacuum break devices for each vehicle but also to have a variety of types of vacuum break devices for the different models of engines and different models of vehicles.

It is an object of the invention to provide a single vacuum break device with two stages of operation which eliminates the need for a pair of vacuum break devices.

Another object of the invention is to provide a vacuum device with two stages of operation which simplifies the linkage connections required between the carburetor and the vacuum break device.

Another object of the invention is to provide a two stage vacuum break in which both stages of operation may be delayed and may be easily modified to achieve different periods of delay.

A two stage vacuum break of fluid motor is provided wherein a housing contains an auxiliary housing that is supported by means of a diaphragm so that upon admission of vacuum pressure to the interior of the housing, the diaphragm and auxiliary housing move as a unit in a first stage until the auxiliary housing engages the primary housing. Thereafter the auxiliary housing receives vacuum from the source of vacuum while the remainder of the housing is isolated which causes the auxiliary housing to collapse and move an output plunger in a second stage. The admission of variable or vacuum pressure in the first stage of movement is under the control of a first time delay valve and admission of vacuum to the collapsible chamber in the second stage of movement is under the control of a second time delay valve. The two time valves delay movement in both the first and second stages and permit substantially unrestricted movement of the plunger in the opposite direction.

These and other objects of the invention will be apparent from the following description and from the drawings in which.

Figure 3:
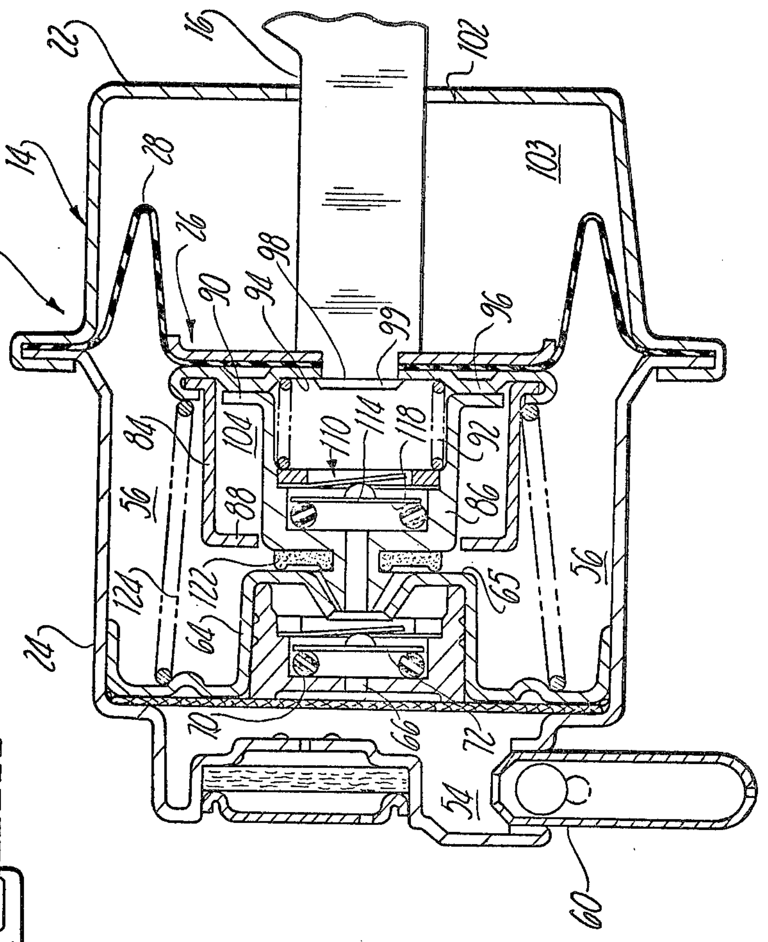
FIG. 3 is a view similar to FIG. 2 but showing the vacuum break in another condition of operation.
Figure 1:
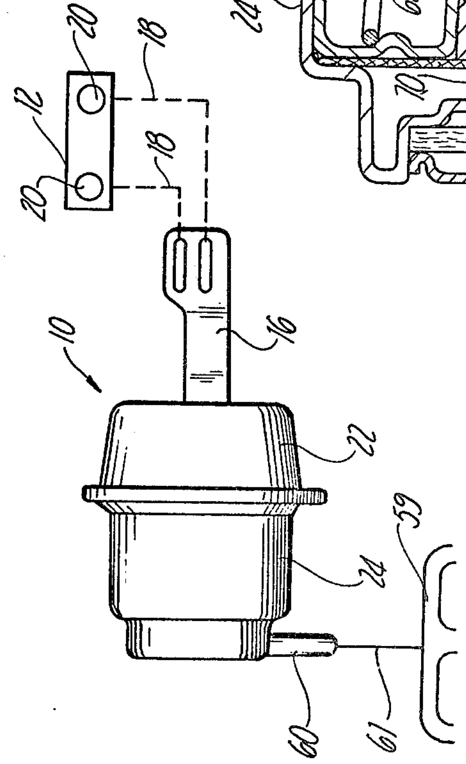
FIG. 1 is a schematic view showing a two stage vacuum break embodying the invention in its relationship to a carburetor and an intake manifold.

Referring to the drawings, the vacuum break device embodying the invention is designated generally at 10 and is adapted to be supported on a carburetor 12. The vacuum break device 10 includes a housing 14 from which a movable plunger 16 projects. The plunger 16 is adapted for connection to control linkages indicated at 18 to move choke valves 20 from their closed to an open position.

Figures 2, 4:
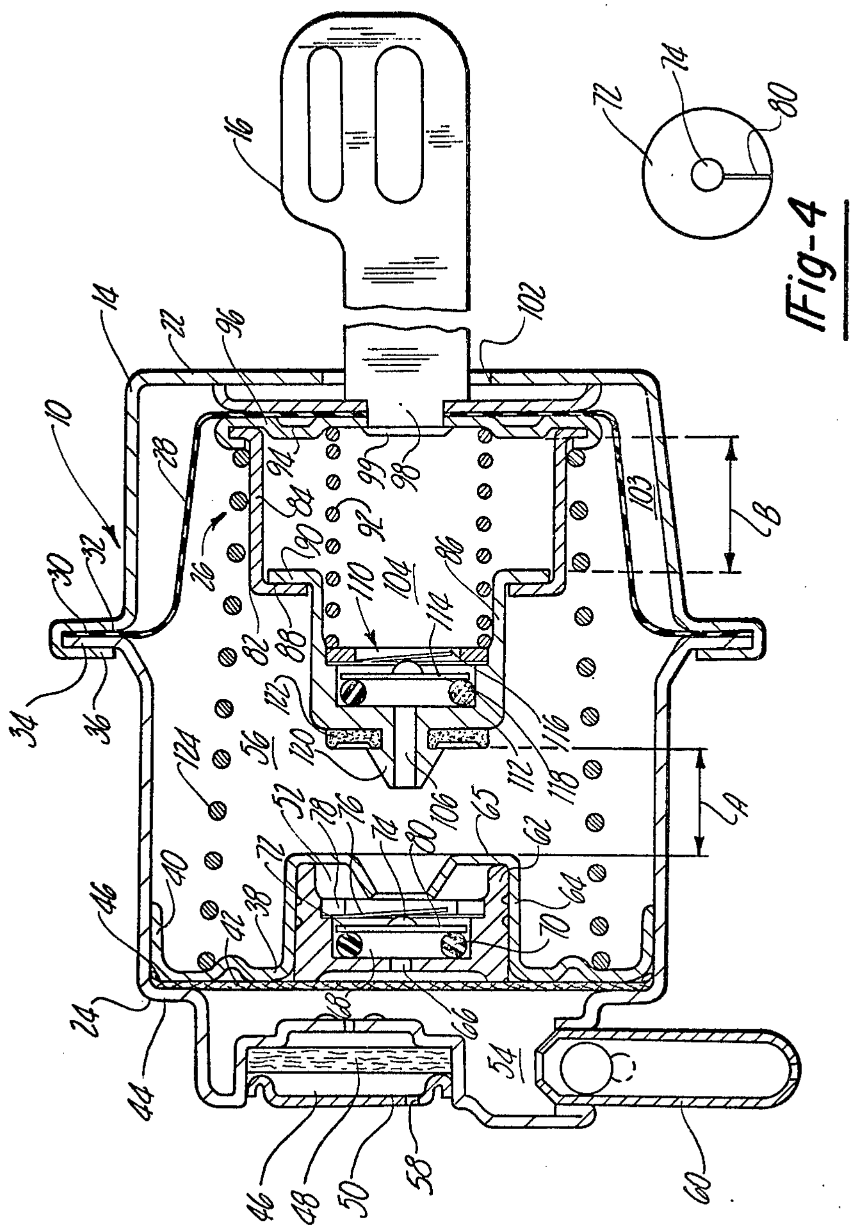
FIG. 2 is a cross sectional view of the vacuum break at an enlarged scale.
FIG. 4 is a view of one of the valve elements seen in FIGS. 2 and 3.

Referring now to FIG. 2, the housing 14 of the vacuum break device 10 includes a front housing section or cover 22 and a rear housing cover or section 24. Disposed within the housing 14 is a diaphragm assembly 26 which includes a flexible diaphragm 28 made of an elastomeric material and having an outer circumferential flange 30 clamped between annular flanges 32 and 34 of the front and rear covers 22 and 24, respectively. The flange 32 is folded over the flange 34 by a portion indicated at 36 to form a fluid tight housing 14.

The rear cover assembly 24 includes a rigid interior wall 38 having an outer circumferential flange 40 which engages an inner circumferential wall of the rear cover 24. The wall 38 holds a filter element 42 in position relative to an annular end wall 44. A large O-ring 46 is disposed between the filter element 42 and the wall member 38 to provide a fluid tight seal. The rear cover assembly 24 forms an axially offset cavity 46 in which another filter element 48 is held in positoin by a cap 50. The wall 38 supports a valve assembly 52 which controls fluid flow between an intake chamber 54 formed at one side of the wall 38 and a control of actuating chamber 56 at the opposite side of the wall 38.

Atmospheric air is admitted through a small opening 58 to the intake chamber 54. A source of vacuum such as that available at the intake manifold 59 of an internal combustion engine is communicated to an inlet tube element 60 by way of a line 61 to make vacuum pressure available in the intake chamber 54.

Air flow from the vacuum inlet tube 60 to the control chamber 56 is under the control of the valve assembly 52. The valve assembly 52 includes a valve housing 62 held in a tubular portion 64 extending from the wall 38 and having an annular, radially extending wall 65. The valve housing has an axial air passage 66 which communicates a valve cavity 68 and the valve housing 62 with intake chamber 54. An O-ring 70 is seated in the valve housing 62 around the air passage 66. A disc-like valve closure element 72 is engagable with a face of the O-ring 70 and is provided with an axial protusion 74 engaged by a leaf spring 76 made of plastic or the like and held in position relative to the valve housing 62 by a ring 78. The valve closure element 72 is provided with a very small radially extending groove indicated at 80 which provides a restricted passage for air when the valve closure element 72 is seated on O-ring 70. Under certain conditions of operation the valve closure element 72 separates from the O-ring 70 as will be described later.

The diaphragm assembly 26 supports a collapsible housing 82. The housing 82 includes an outer body portion 84 and an inner body 86 which telescopes within the outer body 84. The outer body 84 is provided with an annular flange 88 which extends radially inwardly and the inner body member 86 is provided with an annular flange 90 which extends radially outwardly. The annular flanges 88 and 90 are maintained in engagement with each other by a spring 92 which acts to bias the outer and inner body members 94 and 96 away from each other. One end of the spring 92 is seated on an end wall 94 of the cup-shaped outer body member 84. The end wall 94 engages one side of the diaphragm 28 and the other side of the diaphragm is engaged by a backing disc 96. The end wall 94 and backing disc 96 are held in clamping relationship relative to the diaphragm 28 by a stem portion 98 which extends through the end wall 94 and disc 96 and has its end 99 upset like a rivet to hold the wall and disc relative to the diaphragm. The stem 98 forms one end of the plunger 16 which extends through an opening 102 in the front cover 22.

The interior of the collapsible housing 82 forms a chamber 104 which communicates with the control chamber 56 through an air passage 106. The passage 106 is under the control of a valve assembly 110 which is identical to the valve 52 in that it includes an O-ring 112, a valve closure element 114, and leaf spring 116. The valve disc 114 has a groove 118 which may be different in size than the similarly located groove 80 in the valve 52.

The inner body member 86 has an axial stem portion 120 which supports an annular ring 122 of elastomeric material. Upon reciprocation of the diaphragm assembly 26 the ring 122 engages and seats on the annular wall 65 at the end of the tube portion 64 as best seen in FIG. 3.

The diaphragm assembly 26 is biased to the right as viewed in the drawings by a spring 124 which acts to hold the backing disc 96 in engagement with an inner wall of the front cover 22. The opening 102 receiving the stem 16 communicates the exterior of the housing with a chamber 103 formed within the front cover 22 at one side of the diaphragm 28. This chamber is in continuous communication with the atmosphere.

Upon admission of the vacuum to the inlet tube 60 which would occur upon starting an engine whose intake manifold forms the source of vacuum pressure, vacuum will be established at the air passage 66. As a result, air in the chamber 56 will be evacuated through the groove 80 and the air passage 66. As a pressure differential is established between the chambers 56 and the atmospheric chamber 103, the diaphragm assembly 26 will move the plunger 16 to the left as viewed in the drawings against the action of the spring 124 until annular ring 122 engages the annular wall 65 at the end of tube 64. This serves to interrupt further communication between air passage 66 and the chamber 56. However, evacuation of air from the chamber 104 is initiated through the groove 118. As a result, the outer body 84 moves relative to the inner body 86 which is held stationary against the annular wall 65. Such movement continues until the end wall 94 comes into engagement with the annular flange 90 on the inner body member 86.

When the source of vacuum is interrupted, as would occur when the engine is stopped, the pressure in the inlet tube 60 increases to the pressure of the atmospheric air. As a result of vacuum pressure in chamber 56, a pressure differential is created across the valve closure element 72. This causes the valve closure element 72 to lift from the O-ring 70 thereby creating an enlarged opening by which the pressures in the chamber 56 and in the inlet tube 60 are rapidly equalized. In the same manner, the establishment of atmospheric air pressure in the chamber 56 results in a pressure differential across the valve element 110 due to the vacuum pressure in the chamber 104. This causes the valve closure element 114 to lift from the O-ring 112 and rapidly equalizes the pressures in the chambers 56 and 104.

During the return from vacuum to atmospheric pressure in the chambers 56 and 104, the spring 124 acts to move the diaphragm assembly 26 in a return direction or to the right and the spring 92 acts to move the outer and inner body members 84 and 86 apart relative to each other to bring the annular flanges 88 and 90 into engagement with each other. Because of the opening of the valves 52 and 110, atmospheric pressure is established rapidly and the plunger 16 moves in a return direction in a continuous smooth action.

The grooves 80 and 118 of the valve assemblies 52 and 110 control the time required for the vacuum break 10 to move the plunger 16 through its full stroke. The size of the grooves 80 and 118 determines the rate of movement of the plunger 16.

The full range of movement of the plunger 16 requires movement of the diaphragm assembly in a first stage through a distance represented by the dimension A which is the distance between the annular ring 112 and the annualr wall 65. The movement in the second stage is represented by the dimension B which is the distance between the annular flange 90 and the end wall 94. The time required for the plunger 16 to travel in the initial stage can be different than the time required to travel in the second stage. By way of example, the first stage of movement A could require from two to four seconds whereas the time to travel in the second stage B can be controlled to require four through six seconds. Also if desired, the valve assembly 52 may be omitted. In that case, when the vacuum pressure is established in the tube 60, the first stage of movement of the plunger 16 would occur without any delay and only the second stage of movement would have delay determined by the size of the groove 118.

A two stage fluid motor or vacuum break for use in a charge forming system has been provided in which a single diaphragm arrangement is connected by way of a single vacuum source to operate an output member in two stages. In the first stage the movement of the plunger may be controlled to occur over a period of time which is different than the time required to move in the first stage.

I claim:

1. A fluid motor device comprising; a housing, a diaphragm movable axially in said housing and forming an actuating chamber at one side, an auxiliary housing carried by said diaphragm and being movable therewith, said auxiliary housing including a wall movable from our initial position axially relative to said diaphragm to form a collapsible chamber in said auxiliary housing, a passage communicating said actuating chamber and said collapsible chamber when said diaphragm is in an initial position, a source of pressure, passage means connecting said source to said actuating chamber, an output member connected to said diaphragm and being movable in a first stage at a first rate upon establishment of pressure in said actuating chamber to move said diaphragm and said auxiliary housing, said movable wall engaging said housing at the end of said first stage to isolate said actuating chamber from said passage means and communicate said collapsible chamber with said passage means to collapse said auxiliary housing and move said output member in a second stage at a second rate upon establishment of pressure in said collapsible chamber, and means biasing said diaphragm and said wall toward said initial postions of said diaphragm and said wall.

2. A combination of claim 1 in which said means connecting said source to said actuating chamber includes a restricted passage limiting fluid flow to delay movement of said output member in said first stage.

3. The combination of claim 1 in which said first mentioned passage communicating said actuating chamber and said collapsible chamber is restricted in size to limit fluid flow to delay movement of said output member in said second stage.

4. The combination of claim 1 and further comprising first valve means controlling the inlet to said actuating chamber and second valve means controlling the inlet to said collapsible chamber, each of said valve means restricting fluid flow in one direction and permitting opening and free fluid flow in the opposite direction.

5. The combination of claim 1 in which said auxiliary housing is formed by a pair of telescoping members, and means biasing said telescoping members apart to form said collapsible chamber.

6. The combination of claim 5 and further comprising an auxiliary valve supported by one of said telescoping members and affording communication between said actuating chamber and said collapsible chamber and a second position in which said actuating chamber is isolated from said source and from said collapsible chamber and the latter is in communication with said source.

7. The combination of claim 4 in which said first valve means communicates directly with said second valve means and independantly of said actuating chamber after movement of said diaphragm assembly in said first stage.

8. The combination of claim 1 wherein said output member moves in said first stage a distance defined by the spacing of said wall and said housing and in which said output member moves in said second stage a distance defined by the amount that said auxiliary housing collapses upon engagement of said wall with said housing.

* * * * *